(12) United States Patent
Zhu et al.

(10) Patent No.: US 11,294,148 B2
(45) Date of Patent: Apr. 5, 2022

(54) METHOD FOR DESIGNING FREEFORM SURFACE IMAGING SYSTEMS

(71) Applicants: Tsinghua University, Beijing (CN); HON HAI PRECISION INDUSTRY CO., LTD., New Taipei (TW)

(72) Inventors: Jun Zhu, Beijing (CN); Ben-qi Zhang, Beijing (CN); Guo-Fan Jin, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 110 days.

(21) Appl. No.: 16/998,185

(22) Filed: Aug. 20, 2020

(65) Prior Publication Data

US 2021/0373288 A1 Dec. 2, 2021

(30) Foreign Application Priority Data

May 29, 2020 (CN) .......................... 202010482358.8

(51) Int. Cl.
  *G02B 13/00* (2006.01)
  *G02B 5/08* (2006.01)
  *G02B 27/00* (2006.01)

(52) U.S. Cl.
  CPC ........... *G02B 13/0005* (2013.01); *G02B 5/08* (2013.01); *G02B 27/0025* (2013.01)

(58) Field of Classification Search
  CPC ... G02B 13/0005; G02B 5/08; G02B 27/0025
  See application file for complete search history.

(56) References Cited

U.S. PATENT DOCUMENTS

| | | | |
|---|---|---|---|
| 2016/0232258 A1* | 8/2016 | Yang | G02B 17/0642 |
| 2018/0157017 A1* | 6/2018 | Gong | G02B 17/0642 |
| 2018/0180479 A1* | 6/2018 | Zhu | G02B 3/02 |
| 2018/0210981 A1* | 7/2018 | Zhu | G02B 27/0012 |
| 2019/0250033 A1 | 8/2019 | Zhu et al. | |

FOREIGN PATENT DOCUMENTS

TW 201937228 9/2019

\* cited by examiner

*Primary Examiner* — Robert E. Tallman
(74) *Attorney, Agent, or Firm* — ScienBiziP, P.C.

(57) ABSTRACT

A method for designing freeform surface imaging system comprises: constructing a series of coaxial spherical systems with different optical power (OP) distributions; tilting all optical elements of each coaxial spherical system by a series of angles to obtain a series of off-axis spherical systems; finding all unobscured off-axis spherical systems; and then specifying a system size or structural constraints, and finding a series of compact unobstructed off-axis spherical systems; constructing a series of freeform surface imaging systems based on the series of compact unobstructed off-axis spherical system, and correcting the OP of entire system; improving an image quality of each freeform surface imaging systems and finding an optimal tilt angle of an image surface; and automatically evaluating an image quality of each freeform surface imaging system based on an evaluation metric, and outputting the freeform surface imaging systems that meet a given requirements.

20 Claims, 10 Drawing Sheets constructing a series of coaxial spherical systems with different optical power (OP) distributions, wherein the series of coaxial spherical systems with different OP distributions are defined as $P_1, P_2, \ldots, P_m, \ldots, P_M$, and a set of $P_1, P_2, \ldots, P_m, \ldots, P_M$ is defined as a set $\{P\}$; and the OP distribution refers to a combination of radius of curvature and spaces between surfaces of the coaxial spherical system; — S1 tilting all optical elements of each coaxial spherical system in the set $\{P\}$ by a series of angles to obtain a series of off-axis spherical systems, wherein the series of off-axis spherical systems are defined as $C_{m,1}, C_{m,2}, \ldots, C_{m,s}, \ldots, C_{m,Sm}$, and a set of the $C_{m,1}, C_{m,2}, \ldots, C_{m,s}$ is defined as a set $\{C\}_m$; finding all unobscured off-axis spherical systems from the set $\{C\}_m$, wherein the unobscured off-axis spherical systems are defined as $\tilde{C}_{m,1}, \tilde{C}_{m,2}, \ldots, \tilde{C}_{m,s}, \ldots, \tilde{C}_{m,Rm}$, and a set of $\tilde{C}_{m,1}, \tilde{C}_{m,2}, \ldots, \tilde{C}_{m,s}, \ldots, \tilde{C}_{m,Rm}$ is defined as a set $\{\tilde{C}\}_m$; and then specifying system size or structural constraints, and finding a series of compact unobstructed off-axis spherical systems from the set $\{\tilde{C}\}m$, wherein the series of compact unobstructed off-axis spherical systems are defined as $\hat{C}_{m,1}, \hat{C}_{m,2}, \ldots, \hat{C}_{m,s}, \ldots, \hat{C}_{m,Tm}$, and a set of $\hat{C}_{m,1}, \hat{C}_{m,2}, \ldots, \hat{C}_{m,s}, \ldots, \hat{C}_{m,Tm}$ is defined as a set $\{\hat{C}\}_m$; — S2 constructing a freeform surface imaging system based on each compact unobstructed off-axis spherical system in the set $\{\hat{C}\}_m$, to obtain a series of freeform surface imaging systems, and correcting an OP of an entire system in a process of constructing the series of freeform surface imaging systems, wherein the series of freeform imaging systems are defined as $\tilde{F}_{m,1}, \tilde{F}_{m,2}, \ldots, \tilde{F}_{m,s}, \ldots, \tilde{F}_{m,Tm}$ and a set of $\tilde{F}_{m,1}, \tilde{F}_{m,2}, \ldots, \tilde{F}_{m,s}, \ldots, \tilde{F}_{m,Tm}$ is defined as a set $\{\tilde{F}\}_m$; — S3 improving an image quality of each of the series of freeform surface imaging systems in the set $\{\tilde{F}\}_m$ by calculating a surface shape of each optical element of each freeform surface imaging system in the set $\{\tilde{F}\}_m$ and finding an optimal tilt angle of an image surface, to obtained a series of freeform surface imaging systems with different structural forms and different OP distributions — S4 automatically evaluating an image quality of each of the series of freeform surface imaging system with different structural forms and different OP distributions based on an evaluation metric and outputting at least one freeform surface imaging system that meets a given requirements — S5

FIG. 1

METHOD FOR DESIGNING FREEFORM SURFACE IMAGING SYSTEMS

CROSS-REFERENCE TO RELATED APPLICATIONS

This application claims all benefits accruing under 35 U.S.C. § 119 from China Patent Application No. 202010482358.8, filed on May 29, 2020, in the China Intellectual Property Office, the contents of which are hereby incorporated by reference.

FIELD

The present disclosure relates to a method for designing freeform surface imaging systems, especially relates to a method for freeform surface imaging systems with high degree of automation.

BACKGROUND

Freeform surfaces are optical surfaces that lack translational or rotational symmetry. Freeform surfaces not only improve an overall performance of an optical system but also bring novel functions to the optical system. With advancements in optical processing and testing, the freeform surfaces are becoming popular in an optical design field. The freeform surfaces bring more degrees of freedom to the optical system and increase a dimension of aberration equations.

There are three main ways for solving an initial solution of a freeform surface system. First, an existing design is taken as the initial solution. Second, the initial solution is determined based on aberration theories. For example, a nodal aberration theory (NAT) can be used to estimate a potential capability to correct aberrations in a freeform surface system with different structural forms, and enable full utilization of the degrees-of-freedom of freeform surfaces. Third, the initial solution is constructed based on an object-image relationship using direct design methods, such as methods based on differential equations, simultaneous multiple surface (SMS) methods, and construction-iteration (CI) methods.

In recent years, some procedures in conventional methods for designing the freeform surfaces system have been automated. However, conventional methods for designing the freeform surfaces system still highly rely on manual completion and have less automation. Therefore, conventional methods for designing the freeform surfaces system require higher designer experience, and waste time and human resources.

BRIEF DESCRIPTION OF THE DRAWINGS

Implementations of the present technology will now be described, by way of example only, with reference to the attached figures, wherein:

FIG. 1 is a flow diagram of one embodiment of a method for designing freeform surface imaging system.

DETAILED DESCRIPTION

Figure 2:
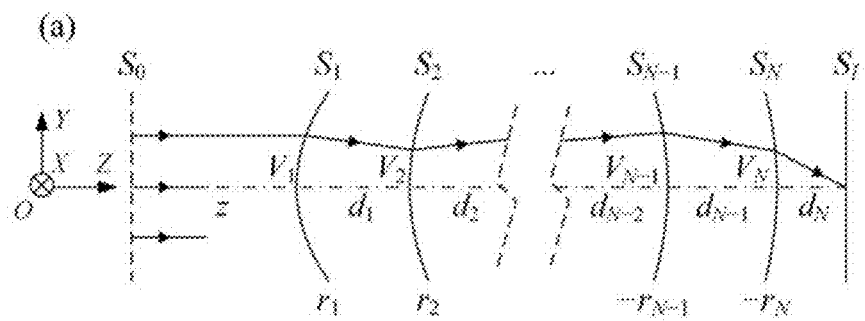
FIG. 2 is a schematic diagram of one embodiment of a coordinate system and a description method in a coaxial system.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Referring to FIG. 1, one embodiment is described in relation to a method for designing freeform surface imaging systems comprises steps of:

S1: constructing a series of coaxial spherical systems with different optical power (OP) distributions, wherein the series of coaxial spherical systems with different OP distributions are defined as $P_1, P_2, \ldots, P_m, \ldots, P_M$, and a set of $P_1, P_2, \ldots, P_m, \ldots, P_M$ is defined as a set $\{P\}$; and the OP distribution refers to a combination of radius of curvature and spaces between surfaces of the coaxial spherical system;

S2: tilting all optical elements of each coaxial spherical system in the set $\{P\}$ by a series of angles to obtain a series of off-axis spherical systems, wherein the series of off-axis spherical systems are defined as $C_{m,1}, C_{m,2}, \ldots, C_{m,s}, \ldots, C_{m,S_m}$, and a set of the $C_{m,1}, C_{m,2}, \ldots, C_{m,s}$ is defined as a set $\{C\}_m$; finding all unobscured off-axis spherical systems from the set $\{C\}_m$, wherein the unobscured off-axis spherical systems are defined as $\overline{C}_{m,1}, \overline{C}_{m,2}, \ldots, \overline{C}_{m,r}, \ldots, \overline{C}_{m,R_m}$, and a set of $\overline{C}_{m,1}, \overline{C}_{m,2}, \ldots, \overline{C}_{m,r}, \overline{C}_{m,R_m}$ is defined as a set $\{\overline{C}\}_m$; and then specifying system size or structural constraints, and finding a series of compact unobstructed off-axis spherical systems from the set $\{\overline{C}\}m$, wherein the series of compact unobstructed off-axis spherical systems are defined as $\tilde{C}_{m,1}, \tilde{C}_{m,2}, \ldots, \tilde{C}_{m,t}, \ldots, \tilde{C}_{m,T_m}$, and a set of $\tilde{C}_{m,1}, \tilde{C}_{m,2}, \ldots, \tilde{C}_{m,t}, \ldots, \tilde{C}_{m,T_m}$ is defined as a set $\{\tilde{C}\}_m$;

S3: constructing a freeform surface imaging system based on each compact unobstructed off-axis spherical system in the set $\{\tilde{C}\}_m$, to obtain a series of freeform surface imaging systems, and correcting an OP of an entire system in a process of constructing the series of freeform surface imaging systems, wherein the series of freeform imaging systems are defined as $\tilde{F}_{m,1}, \tilde{F}_{m,2}, \ldots, \tilde{F}_{m,t}, \ldots, \tilde{F}_{m,T_m}$, and a set of $\tilde{F}_{m,1}, \tilde{F}_{m,2}, \ldots, \tilde{F}_{m,t}, \ldots, \tilde{F}_{m,T_m}$ is defined as a set $\{\tilde{F}\}_m$;

S4: improving an image quality of each of the series of freeform surface imaging systems in the set $\{\tilde{F}\}_m$ by calculating a surface shape of each optical element of each freeform surface imaging system in the set $\{\tilde{F}\}_m$ and finding an optimal tilt angle of an image surface, to obtained a series of freeform surface imaging systems with different structural forms and different OP distributions; and S5: automatically evaluating an image quality of each of the series of freeform surface imaging system with different structural forms and different OP distributions based on an evaluation metric and outputting at least one freeform surface imaging system that meets a given requirements.

Figure 3:
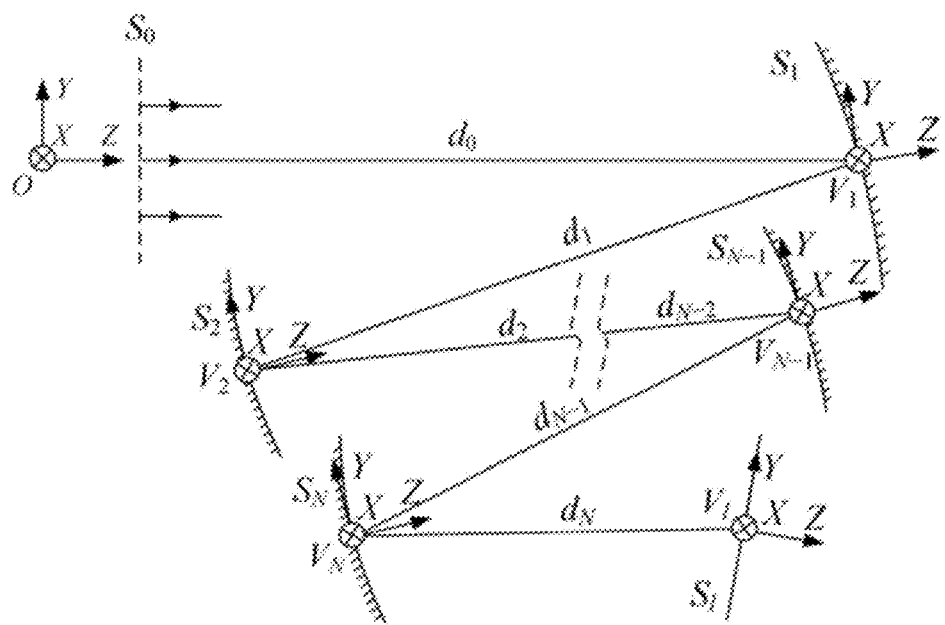
FIG. 3 is a schematic diagram of one embodiment of a global coordinate system, a local coordinate system, and a description method in an Off-axis spherical system.

Referring to FIG. 2 and FIG. 3, a global coordinate system O-XYZ is defined in a space of a coaxial spherical systems. An incident direction of light in a central field (0°) is defined as a Z axis, and a plane perpendicular to the Z axis is defined as an XOY plane. The number of optical surfaces of the coaxial spherical system is N, and the spherical surfaces of the coaxial spherical system are denoted as $S_1, S_2, \ldots, S_i, \ldots, S_N$ according to an order of light passing. $S_0$ is a virtual surface in front of the coaxial spherical system, and $S_I$ is an image surface of the coaxial spherical system. The incident direction of lights in the central field (0°) is set along a direction of a unit axis vector OZ, the lights in the central field (0°) emerge from $S_0$ and reach $S_1$. As shown in FIG. 2, the coaxial spherical system is rotationally symmetrical about an optical axis Oz. A centre of the spherical surface $S_i$ is located on the optical axis Oz and defined as $O_i$. The spherical surface $S_i$ intersects the optical axis Oz at a vertex point $V_i$. A radius of curvature of the spherical surface $S_i$ is defined as $r_i$, when a vector $V_iO_i$ and the unit axial vector OZ are oriented in the same direction, the sign of $r_i$ is positive; otherwise, the sign of $r_i$ is negative. A distance between the spherical surface $S_i$ and a spherical surface $S_{i+1}$ is defined as $d_i$, and $d_i$ is equal to $|V_iV_{i+1}|$. When a vector $V_iV_{i+1}$ and the unit axial vector OZ are oriented in the same direction, the sign of $d_i$ is positive; otherwise, the sign of $d_i$ is negative.

Referring to FIG. 3, since the off-axis spherical system does not have a rotational symmetry axis as a reference, a local coordinate system is established at each surface of the off-axis spherical system, and a surface shape is described using the local coordinate system. A chief light ray of the central field is set as the reference for the off-axis spherical system. An incident point of the chief light ray of the central field on the spherical surface $S_i$ is defined as $V_i$. A local coordinate system $V_i$-XYZ is established with $V_i$ as origin. A unit axis vector $V_iZ$ and a surface normal direction of the spherical surface at $V_i$ are parallel. A unit axis vector $V_iY$ is in a plane O-YZ of the global coordinate system O-XYZ and is perpendicular to the unit axis vector $V_iZ$. A unit axis vector $V_iX$ and a unit axis vector OX have the same direction. The chief light ray of the central field intersects the spherical surface $S_0$ at point $V_0$ and intersects the spherical surface $S_I$ at $V_I$. A direction of the unit axis vector $V_IZ$ of a local coordinate system $V_I$-XYZ is perpendicular to the image surface, and a unit axis vector $V_IY$ is in the plane O-YZ of the global coordinate system and is perpendicular to the unit axis vector $V_IZ$. A unit axis vector $V_IX$ and the unit axis vector OX have the same direction.

In step S1, the series of coaxial spherical systems with different OP distributions are constructed according to first-order optics and a known focal length. According to the knowledge of matrix optics, a reflection matrix $R_i$ for reflection of the light ray at the spherical surface $S_i$ is:

$$R_i = \begin{bmatrix} 1 & (n_i - n_{i-1})/r_i \\ 0 & 1 \end{bmatrix}, \quad (1)$$

where $n_i$ represents a refractive index of a medium between the spherical surface $S_i$ and the spherical surface $S_{i+1}$; $n_{i-1}$ represents a refractive index of a medium between the spherical surface $S_{i-1}$ and the spherical surface $S_i$; and $r_i$ represents the radius of curvature of the spherical surface $S_i$.

A transition matrix of a light ray propagating from the spherical surface $S_i$ to the spherical surface $S_{i+1}$ is:

$$D_i = \begin{bmatrix} 1 & 0 \\ -d_i/n_i & 1 \end{bmatrix}, \quad (2)$$

wherein, $d_i$ is a distance between the spherical surface $S_i$ and the spherical surface $S_{i+1}$.

And a transfer matrix T (system matrix) for the entire system is:

$$T = R_N D_{N-1} R_{N-1} L R_2 D_1 R_1 = \begin{bmatrix} B & A \\ D & C \end{bmatrix}, \quad (3)$$

wherein A, B, C, and D are functions of $r_i$, $d_i$ and $n_i$. "A" can be expressed as $A(r_i, d_i, n_i)$. Therefore, an image focal length of the coaxial spherical system can be expressed as:

$$f' = \frac{n_N}{A(r_i, d_i, n_i)}. \quad (4)$$

Because the image focal length of the coaxial spherical system has been given, equation (4) represents an equation that the radius of curvature $r_i$ (i=1, 2, ..., N) of the spherical surface $S_i$ and the distance between the spherical surface $S_i$ and the spherical surface $S_{i+1}$ (i=1, 2, ..., N−1). In a reflection system, a condition $n_i = -n_{i-1}$ applies; therefore, all the refractive indices in the equation (4) can be eliminated. Equation (4) has an infinite number of solutions and thus it is impossible to discuss all solutions to Equation (4). Given that there are manufacturability limits in practice, some solutions to Equation (4) should be disregarded. Related specific parameters include, for example: the size and sign of the radius of curvature of a mirror surface, a vector height of a mirror surface shape, and a distance between mirrors. In a process of solving, constraints on equations should be set according to an actual situation to narrow a solution space.

In Equation (4), there is a total of 2N−1 parameters for the radii of curvature and mirror distances, the radii of curvature are defined as $r_1, r_2, \ldots, r_N$, and the mirror distances are defined as $d_1, d_2, \ldots, d_{N-1}$. When the focal length of the coaxial spherical system is given, as long as 2N−2 parameters out of the 2N−1 parameters are given, it is possible to solve for a last remaining parameter. After the 2N−1 parameters are obtained, an additional parameter $d_N$ can be determined using the first order optics, the additional parameter $d_N$ represents a distance between a last spherical surface and the image surface. Therefore, there are a total of 2N parameters that describe the coaxial spherical system. Because there are infinite solutions to equation (4), there are infinite possible combinations of the values of the 2N parameters. The 2N parameters are placed together in a vector P=[$r_1, r_2, \ldots, r_{N-1}, r_N, d_1, d_2, \ldots, d_{N-1}, d_N$]. The vector P can be used to describe the OP distribution of the coaxial spherical system.

In one embodiment, the series of coaxial spherical systems with different OP distributions $P_1, P_2, \ldots, P_m, \ldots, P_M$ are used as a research object, and the set of $P_1, P_2, \ldots, P_m, \ldots, P_M$ is defined as the set {P}. The given 2N−2 parameters are assumed as $r_1, r_2, \ldots, r_{N-1}, r_N, d_1, d_2, \ldots, d_{N-2}$, wherein a range of the radius of curvature $r_i$ (i=1, 2, ..., N) of each mirror surface of each coaxial spherical system is [$r_{min}, r_{max}$] with an interval $\Delta r$. That is, sequences of the radii of curvature $r_i$ (i=1, 2, ..., N) are given as $r_{min}+\Delta r, r_{min}+2\Delta r, \ldots, r_{max}$. A range of the mirror distance of each coaxial spherical system $d_i$ (i=1, 2, ..., N−2) is [$d_{min}, d_{max}$] with an interval $\Delta d$. That is, sequences of mirror distances $d_i$ (i=1, 2, ..., N−2) are given as $d_{min}+\Delta d, d_{min}+2\Delta d, \ldots, d_{max}$. When the values of $r_1, r_2, \ldots, r_{N-1}, r_N$ and $d_1, d_2, \ldots, d_{N-2}$ are determined, the corresponding $d_{N-1}$ and $d_N$ can be solved. In this way, all the parameters can be obtained, and a series of different OP distribution forms {P} satisfying the image focal length focal length f are obtained.

Since there are infinite kinds of OP distribution forms {P} that satisfy the given image focal length f, a value range of the parameters in the series of different OP distribution forms {P} must be limited. When determining the value range of the radius of curvature $r_i$ (i=1, 2, ..., N), the values of the radii of curvature and the positive/negative state of the OP of each mirror surface of the coaxial spherical system can be controlled. In one embodiment, the range of the radius of curvature of each mirror surface is [−1000 mm, 1000 mm]. In one embodiment, when determining the range of the mirror distance $d_i$ (i=1, 2, ..., N−2), three factors are considered; first, the values of the mirror distances should not be too large to avoid large system volumes. Second, the values of the mirror distance should not be too small, in order to off-axis the system and avoid blocking in the subsequent phases. Third, the differences between two arbitrary mirror distances should not be too large to guarantee system compactness. Because an overall optical system size is usually comparable to an entrance pupil size, an entrance pupil diameter (EPD) can be used as an unit length to describe the range of the mirror distance. In one embodiment, EPD≤|$d_1$|≤4×EPD. If the value of $\Delta r$ and the value of $\Delta d$ are too high, there will be few output results; however, if the value of $\Delta r$ and the value of $\Delta d$ are too small, the number of output results will be increased, but more computation time will be consumed. Therefore, when determining the value of $\Delta r$ and the value of $\Delta d$, a balance should be made between the number of final solutions and the calculation time. In one embodiment, the OP distribution form is P=[$r_1, r_2, r_3, d_1, d_2, d_3$], wherein a range of a radius of curvature of each of $r_1, r_2, r_3$ is [−1000 mm, 1000 mm], and $\Delta r$=100 mm. A value of $\Delta r$ is determined according to a percentage of the value range of the radius of curvature, and the value of $\Delta r$ can be changed according to an absolute value of the radius of curvature. In one embodiment, the value of $\Delta r$ is 5% of the radius of curvature r; a range of mirror distance $d_1$ is EPD<|$d_1$|<4×EPD, and a value interval of the mirror distance $\Delta d_1$=EPD/2. The $d_2$ and $d_3$ can be solved based on the radius of curvature, the interval of the radius of curvature, the mirror distances and the interval of the mirror distances. Since the series of coaxial spherical systems are total reflection systems, $d_1$<0, $d_2$>0, $d_3$<0. In one embodiment, the constraints are −2≤$d_2/d_1$≤−½, ½≤$d_3/d_1$≤2, $d_3$≤−2×EPD, a volume of the coaxial spherical system should be controlled, to ensure the structure of the system is compact, and facilitate subsequent off-axis.

Figure 4:
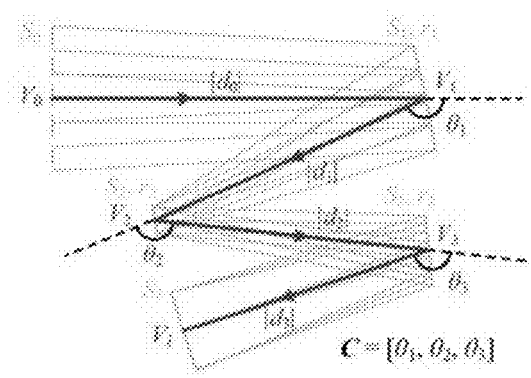
FIG. 4 is a schematic diagram of one embodiment of describing a structural form of a three-mirror system.

In step S2, tilting all optical elements of each coaxial spherical system in the set {P} by a series of angles under keeping an incident direction of light in the center field of the coaxial spherical system unchanged, to obtain a series of off-axis spherical systems with different structures. The series of off-axis spherical systems with different structures comprises structural forms with completely different structures, such as offset field or off-axis field, or a combination of the offset field and the off-axis field. Referring to FIG. 4, in one embodiment, the coaxial spherical system is a three-mirror system, the OP distribution form of the three-mirror system is P=[$r_1, r_2, r_3, d_1, d_2, d_3$], a position of each mirror of the three-mirror system is adjusted to ensure that distances between origins of three local coordinate systems of three mirrors meet $V_1V_2=d_1$, $V_2V_3=d_2$, and |$V_2V_3=d_3$, at the same time, each mirror is tilted by an angle around an unit axis vector $V_iX$ of a respective local coordinate system, to obtain an off-axis spherical system corresponding to the OP distribution form P.

Since a propagation path of main lights of the central field between the surfaces in the off-axis spherical system is a polyline, the propagation path can be used to represent a structural form of the off-axis spherical system. A vector C is used to record a length of each segment of the polyline and an angle between adjacent segments. Referring to FIG. 4, an angle that a vector $V_{i-1}V_i$ rotates to coincide with a vector $V_iV_{i+1}$ is defined as $\theta_i$(i=1, 2, ..., N), $d_i$ is a distance between two mirrors, and a corresponding structural form can be written as a vector C=[$\theta_1$, |$d_1$|, $\theta_2$, |$d_2$|, ... $\theta_1$, |$d_i$|, ..., $\theta_N$, |$d_N$|]. For off-axis spherical systems with the same OP distribution form, only an angle in the vector C is retained, that is, C=[$\theta_1, \theta_2, \ldots \theta_1, \ldots, \theta_N$]. $\theta_i$ reflects a deflection angle of the chief light ray of the central field at a mirror surface $S_i$. When the vector $V_{i-1}V_i$ rotates clockwise to coincide with the vector $V_iV_{i+1}$, the sign of $\theta_i$ is negative, when the vector $V_{i-1}V_i$ rotates counterclockwise to coincide with the vector $V_iV_{i+1}$, the sign of $\theta_i$ is positive. Therefore, $\theta_1$ is more than −360° and less than 0°, or $\theta_i$ is more than 0° and less than 360°. In one embodiment, three deflection angles of the chief light ray of the central field at three mirrors of an off-axis three-mirror spherical system are defined as $\theta_1$<0, $\theta_2$>0, $\theta_3$<0. Referring to FIG. 4, in one embodiment, a structural form of a reflective coaxial system with the OP distribution form P is denoted as $C_0$, for example, a structural form of a coaxial three-mirror spherical system can be written as $C_0$=[$\theta_{10}, \theta_{20}, \theta_{30}$]=[−180, 180, −180].

When each angle $\theta_1$ in the structural form C changes continuously within a certain range, there is no obstruction in an off-axis spherical system corresponding to the structural form C. However, since the off-axis spherical system may have many different off-axis structural forms, there are also many possible value ranges for the angle in structural form C that meets the unobstructed condition, that is, a range of possible values of $\theta_i$ in the structural form C is not continuous. In order to solve all possible unobstructed structural forms corresponding to the OP distribution form P, first listing as many off-axis structural forms as possible, and then eliminating the obstructed systems from the off-axis structural forms in the subsequent steps, so as to obtain as many unobstructed off-axis spherical systems as possible.

A range of the angle $\theta_i$ and an interval of the angle $\theta_i$ are determined first. If the structural form C and a structural form C' satisfy C=−C', the structural form C and structural form C' are actually the same. Therefore, in order to avoid re-considering the same structural form, a value range of $\theta_1$ is within (−180°, 0°) or (0°, 180°). For other angles $\theta_i$, i=2, 3, ..., N, a value range of $\theta_i$ is within (−360°, 0°) or within (0°, 360°). The value range of $\theta_i$ can be selected according to the requirements of the design structure constraints. In one embodiment, for an off-axis three-mirror spherical system, the value range of $\theta_1$ is (−180°, −120°), the value range of $\theta_2$ is [120°, 240°], and the value range of $\theta_3$ is (−240°, −120°). If the interval $\Delta\theta$ of the angle $\theta_1$ is too large, the number of output results will be reduced, but a calculation amount of an entire calculation task will also be reduced. For a coaxial spherical system with an OP distribution form $P_m$, a series of off-axis spherical systems with different off-axis structures can be obtained through the range of the angle $\theta_1$ and the interval of the angle $\theta_1$. The series of off-axis spherical systems with different off-axis structural forms are represented by vectors as $C_{m,1}, C_{m,2}, \ldots, C_{m,s}, \ldots, C_{m,Sm}$, and the vectors $C_{m,1}, C_{m,2}, \ldots, C_{m,s}, \ldots, C_{m,Sm}$ are denoted as the set $\{C\}_m$. There are $S_m$ elements in the set $\{C\}_m$, whether the off-axis spherical system in the set $\{C\}_m$ is blocked should be determined.

Second, the unobstructed off-axis spherical system is selected from the set $\{C\}_m$. When judging whether there is obstruction in the off-axis spherical system, the off-axis spherical system is symmetric about the O-YZ plane is noticed. A projection of a light beam between the mirror surface $S_i$ and the mirror surface $S_{i+1}$ in the O-YZ plane is defined as $B_i$, wherein i=0, 1, ..., N. An area illuminated by a light beam on the mirror surface is defined as a working area of the mirror surface. A curve segment of a working area of the mirror surface $S_j$ intercepted by the O-YZ plane is defined as $E_1^{(j)}E_2^{(j)}$, wherein j=0, 1, ..., N, I, and $S_I$ means image surface. A condition of no obstruction in the off-axis spherical system is: for any $B_i$(i=0, 1, ..., N), any curve segment $E_1^{(j)}E_2^{(j)}$ (j=1, 2, ..., N, I) has no overlap with $B_i$. After filtering according to the condition, a series of unobstructed off-axis spherical systems with the OP distribution form $P_m$ can be obtained, the series of unobstructed off-axis spherical systems are defined as $\overline{C}_{m,1}, \overline{C}_{m,2}, \ldots C_{m,r}, \ldots, \overline{C}_{m,R_m}$. The set of $\overline{C}_{m,1}, \overline{C}_{m,2}, \ldots, \overline{C}_{m,r}, \ldots, \overline{C}_{m,R_m}$ is defined as the set $\{\overline{C}\}_m$, and there are $R_m$ elements in the set $\{\overline{C}\}_m$.

After obtaining the series of unobstructed off-axis spherical systems with different structural forms corresponding to each OP distribution form, the step of constructing the freeform imaging system can be proceed directly. In one embodiment, after the series of unobstructed off-axis spherical systems are obtained, a plurality of unobstructed off-axis spherical systems with a small folding angle of optical path at each mirror are further found from the series of unobstructed off-axis spherical system; and then the step of constructing the freeform imaging systems can be proceed, to obtain a plurality of compact freeform imaging systems. In one embodiment, the system that meets the given structural requirements are found from the series of unobstructed off-axis spherical systems, by changing the value range of the radius of curvature, the interval of the radius of curvature and setting an appropriate filter conditions. In one embodiment, the unobstructed off-axis spherical system is a three-mirror system, for an unobstructed off-axis structural form $C_{m,r}$ with the OP distribution form $P_m$, a new vector $\Delta\overline{C}_{m,r}$ is defined, and $\Delta\overline{C}_{m,r}=\overline{C}_{m,r}-C_0=[\Delta\theta_1, \Delta\theta_2, \ldots \Delta\theta_i, \ldots, \Delta\theta_N]$, wherein $C_0$ is a coaxial structure, and $\Delta\theta_i$ is a folding angle of the optical path at the mirror surface $S_i$. The set of vectors $\Delta\overline{C}_{m,r}$ corresponding to the set $\{\overline{C}\}_m$ is defined as the set $\{\Delta\overline{C}\}_m$. A value of $\Delta\theta_i$ in the vector $\Delta\overline{C}_{m,r}$ reflects an off-axis degree of a system optical path. The smaller an absolute value of $\Delta\theta_i$ in $\Delta\overline{C}_{m,r}$, the smaller an off-axis degree of the system optical path. The symbols of each item of $\Delta\overline{C}_{m,r}$ reflect the folding form of the system optical path. According to the above regulations on the magnitude and sign of $\theta_1$, the sign of the first term in $\Delta\overline{C}_{m,r}$ is positive, and the signs of the second item and third term can be positive or negative. Each combination of positive and negative signs corresponds to a folding form of the optical path, there are 1×2×2=4 types of folding forms of all possible optical paths, each folding form includes a variety of structural forms with different optical path off-axis degrees.

For all folding forms, one or several off-axis spherical systems with a small folding angle of optical path can be found through a minimization method. The minimization method is as follows: since the value intervals of the radius of curvature are equal, it does not exist two vectors in the set $\{\Delta\overline{C}\}_m$ that three items of the two vectors are completely equal, but there are two vectors in the set $\{\Delta\overline{C}\}_m$ that two terms of the two vectors are equal but the third term of the two vectors are not equal. The vectors in the set $\{\Delta\overline{C}\}_m$ are classified to a plurality of categories, in each category, the first item $\Delta\theta_1$ and the second item $\Delta\theta_2$ are equal, and the third item $\Delta\theta_3$ is different. A process of minimizing the item $\Delta\theta_3$ comprises: in each category, a vector with a minimum absolute value of $\Delta\theta_3$ can be found, and a corresponding off-axis spherical system has the smallest optical path angle at a tertiary mirror. The minimum absolute value of $\Delta\theta_3$ in different categories of the plurality of categories may be different. Then, for the vector that has been minimized item $\Delta\theta_3$, the same process of minimizing item $\Delta\theta_3$ is used to minimize the term $\Delta\theta_2$ in the vector. And then, for the vector that has been minimized item $\Delta\theta_2$ and item $\Delta\theta_3$, the same process of minimizing item $\Delta\theta_3$ is used to minimize the term $\Delta\theta_1$ in the vector. Finally, a set of vectors whose term $\Delta\theta_1$, term $\Delta\theta_2$ and term $\Delta\theta_3$ are all minimized are obtained. The structural vectors corresponding to the set of vectors are found from the set $\{\overline{C}\}_m$, and the structural vectors are defined as $\tilde{C}_{m,1}, \tilde{C}_{m,2}, \ldots, \tilde{C}_{m,t}, \ldots, \tilde{C}_{m,Tm}$. The set of $\tilde{C}_{m,1}, \tilde{C}_{m,2}, \ldots, \tilde{C}_{m,t}, \ldots, \tilde{C}_{m,Tm}$ is defined as the set $\{\tilde{C}\}_m$, and there are $T_m$ elements in the set $\{\tilde{C}\}_m$. The vectors in the set $\{\tilde{C}\}_m$ represents a series of compact unobstructed off-axis spherical systems with different optical path folding forms and small optical path folding angles.

Figure 5:
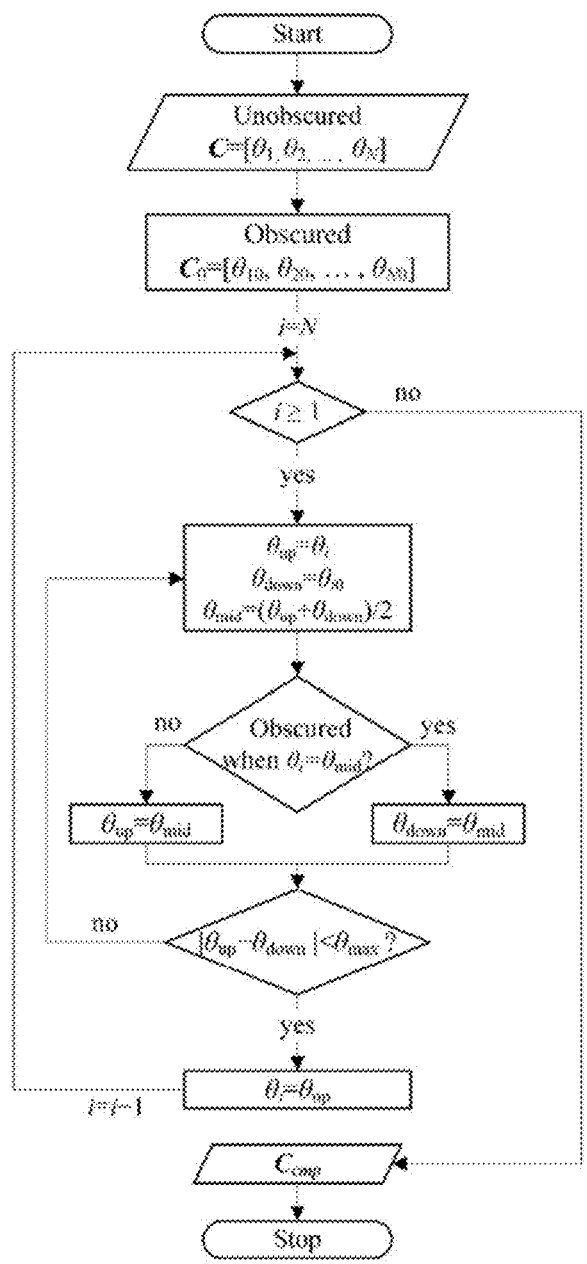
FIG. 5 is a flow diagram of one embodiment of solving a most compact structural form using dichotomy.

In one embodiment, further solving a series of off-axis spherical systems with a smaller optical path folding angle at each mirror based on the set $\{\tilde{C}\}_m$ by a dichotomy. Referring to FIG. 5, in one embodiment, the unobstructed off-axis spherical system is an off-axis three-mirror system, $\tilde{C}_{m,t}=[\theta_1, \theta_2, \theta_3]$ is an element in the set $\{\tilde{C}\}_m$, an optical system corresponding to $\tilde{C}_{m,t}$ is unobstructed; and $C_0=[\theta_{10}, \theta_{20}, \theta_{30}]=[-180, 180, -180]$ corresponds to a coaxial system with obstructions. An upper limit of unobstruction is $\theta_{i,uob}=\theta_i$, a lower limit of obstruction is $\theta_{i,obs}=\theta_{i0}$, an intermediate value is defined as $\theta_{i,mid}=(\theta_{i,uob}+\theta_{i,obs})/2$. If $\theta_i=\theta_{i,mid}$, the system is unobstructed, then let $\theta_{i,uob}=\theta_{i,mid}$; if $\theta_i=\theta_{i,mid}$, the system is obstructed, then let $\theta_{i,obs}\theta_{i,mid}$; and the above steps are repeated until $|\theta_{i,uob}-\theta_{i,obs}|<\theta_{max}$, wherein $\theta_{max}$ is a given threshold. According to the above method, the upper limit $\theta_{3,uob}$, $\theta_{2,uob}$ and $\theta_{1,uob}$ at each mirror are solved in turn, to obtain more compact unobstructed off-axis structure form vectors $\tilde{C}'_{m,t}=[\theta_{1,uob}, \theta_{2,uob}, \theta_{3,uob}]$. The vectors in the set $\{\tilde{C}\}_m$ can be replaced by the more compact unobstructed off-axis structure form vectors $\tilde{C}'_{m,t}$ with smaller bending angles of the optical path. A compactness of the optical path folding of the unobstructed off-axis spherical system can be controlled by adjusting the threshold $\theta_{max}$.

In step S3, since the OP of the entire system has changed after the off-axis process of eliminating the obstruction in step S2, the OP of each mirror should be fine-tuned to correct of the OP of the entire system. An OP correction process of the entire system should follow the following principles. First, the OP correction process can be fully automated; second, the structure of the system remains unchanged during the OP correction process; third, the OP of each mirror is fine-tuned.

In one embodiment, using a point-by-point construction method for freeform surface imaging system to correct the OP of the system. The point-by-point construction method calculates the freeform surface shape based on feature light rays and feature data points. The unobstructed off-axis spherical system is used as a starting point, a plurality of feature light rays corresponding to different aperture positions and different fields is fixed, and a plurality of intersections of the plurality of feature light rays and an optical surface is defined as a plurality of feature data points. Since a field of the plurality of feature light rays is known, according to an object-image relationship, the position coordinates of an image point corresponding to the plurality of feature light rays on the image surface can be determined when the optical system is ideal for imaging (referred to as the position coordinates of an ideal image point). Each of the plurality of feature data points contains two aspects of information, one is a coordinate of the feature data point on the optical surface, and the other is a normal direction of the feature data point on the optical surface. When constructing the freeform surface imaging system, a surface shape of each surface in the freeform surface imaging system is solved one by one in a certain order. In one embodiment, a three-mirror imaging system is solved in an order of tertiary mirror-primary mirror-secondary mirror. When solving a shape of a freeform surface, first, obtaining the starting points and the incident directions of the plurality of feature light rays incident on a surface to be solved through ray tracing. Starting from an initial feature data point on the surface to be sought, according to a principle of the nearest light, and the coordinates and normal directions of the feature data points that have been calculated, determining a next feature light ray and the coordinates of the feature data point corresponding to the next feature light ray. According to the object-image relationship of the system, the plurality of feature light rays starts from the plurality of feature data points on the surface to be solved, and finally reaches the corresponding ideal image points on the image surface. Therefore, according to Fermat's principle, a propagation direction of the next feature light ray leaving the freeform surface to be solved can be obtained. Combining with the incident direction of the next feature light ray on the surface, a normal direction of the feature data point corresponding to the next feature light ray can be obtained. Repeating the above steps until the coordinates and normals of all the plurality of feature data points are solved. Fitting the plurality of feature data points into the freeform surface by a fitting method that simultaneously considers coordinate and normal, to complete solving the shape of a freeform surface. According to the above method, the shape of each surface in the freeform surface imaging system is calculated one by one, therefore, the freeform surface imaging system is constructed.

Each mirror of the unobstructed off-axis spherical system has a certain optical power, and the unobstructed off-axis spherical system meets the first-order imaging conditions. The point-by-point construction method can retain the structure of the system and fine-tune the optical power of each mirror in the system, to complete the correction of the optical power of the entire system. Therefore, the series of freeform imaging systems $\tilde{F}_{m,1}, \tilde{F}_{m,2}, \ldots, \tilde{F}_{m,t}, \ldots, \tilde{F}_{m,Tm}$ are obtained, and the set of $\tilde{F}_{m,1}, \tilde{F}_{m,2}, \ldots, \tilde{F}_{m,t}, \ldots, \tilde{F}_{m,T_m}$ is defined as $\{\tilde{F}\}_m$.

In step S4, on a premise that the OP distribution form and the off-axis structural form of the series of freeform surface systems in the set $\{\tilde{F}\}_m$ remain unchanged, the image quality of each of the series of freeform surface systems in the set $\{\tilde{F}\}_m$ is improved. In one embodiment, a point-by-point iteration is used to calculate the surface shape of the freeform surface imaging system and improve the image quality of the system.

The point-by-point iteration and the point-by-point construction method both solve the surface shape of each surface in the freeform surface imaging system according to the object-image relationship of the system and based on the feature light rays. However, in a process of the point-by-point iteration, the coordinates of the plurality of feature data points obtained by tracing are kept unchanged, only the normal directions of the plurality of feature data points are re-solved, and then a new freeform surface is obtained by fitting the original coordinates and the newly solved normal directions. In a round of iterative calculation, the surface shapes of all freeform surfaces are solved in a certain order, for example, in an order of tertiary mirror-primary mirror-secondary mirror in a three-mirror system. After a round of iterative calculation is completed, the image quality of the freeform surface imaging system needs to be evaluated. In one embodiment, an evaluation index is a root mean square (RMS) of the deviation between a plurality of actual intersections of the plurality of feature light rays with a target surface and the ideal target points. A RMS value is denoted as $\sigma$, and $\sigma$ can be used as an evaluation parameter of the image quality during the process of the point-by-point iteration. A value of $\sigma$ decreases and gradually converges as the process of the point-by-point iteration progresses. The process of the point-by-point iteration is stopped when the image quality of the system is better than the given threshold $\sigma_{itr}$. When the value of $\sigma$ does not decrease, that is, the value of $\sigma$ gradually converges to a certain value, the image quality of the freeform surface imaging system under current condition is difficult to continue to be improved. An improvement rate of image quality in the process of the point-by-point iteration is defined as $\tau=|\sigma'-\sigma|/\sigma$, wherein $\sigma'$ is the image quality evaluation parameter of the iteration result of the current round of iterative calculation, and $\sigma$ is the image quality evaluation parameter of the iteration result of the last round of iterative calculation. The process of the point-by-point iteration is stopped when $\tau$ is below a set threshold $\tau_{itr}$.

In the process of the point-by-point iteration, the normal directions of the plurality of feature data points are solved according to the intersections of the plurality of feature light rays and the image surface are as the ideal image point, which can make the freeform surface imaging system without distortion system. In optical design, the image quality can be improved by sacrificing distortion. In the subsequent stages of the process of the point-by-point iteration, the distortion in the freeform surface imaging system has been controlled to a fairly low level. If the image quality improvement rate T is lower than a given threshold $\tau_{igf}$, an "image quality priority" mode is activated. Under the "image quality priority" mode, in each round of iterative calculation, every time a surface is calculated, the position coordinates of the target image points corresponding to the plurality of feature light rays of each field are updated. The coordinates of new target image points are obtained by obtaining the actual intersection coordinates of all the plurality of feature light rays of the field on the image surface through ray tracing, and then taking an average of each dimension of the actual intersection coordinates to obtain the coordinates of new target image points. By continuously updating the target image point during each round of iterative calculation, more design results with image quality that meet the requirements can be obtained.

Examples of the method for point-by-point constructing the freeform surface imaging system and the method for fitting the plurality of feature data points into a freeform surface are taught by U.S. Pat. No. 10,101,204 to Zhu et al.

The optical power of the entire system is corrected by calculating the shape of the mirror surface, and the image quality of the freeform surface imaging system is improved by iterating the freeform surface shape of the mirror surface. Therefore, a position and an tilt angle of each mirror, a position of the image surface, and the surface shape of the optical surfaces have been considered. There is another factor that needs to be considered, that is, the tilt angle of the image surface.

The tilt angle of the image surface can be expressed by an angle $\beta$ between the Y axis of the local coordinate system of the image surface and the Y axis of the global coordinate system. When the image surface of the optical system is perpendicular to the chief ray of the central field, the tilt angle of the image surface is defined as $\beta_0$. In one embodiment, a optimal tilt angle of the image surface is found using a one-dimensional search method. One round of one-dimensional search for the optimal tilt angle of the image surface is processed as follow, a same off-axis spherical surface system is taken as a starting point, and only the tilt angle of the image surface is different in the process of constructing the freeform surface imaging system through the step S3 and step S4. When the tilt angle of the image surface is different, the image quality of the freeform surface imaging system is also different, and a tilt angle of the image surface corresponding to a freeform surface imaging system with the best image quality is the optimal tilt angle of the image surface. In one embodiment, multiple rounds of one-dimensional search for the optimal tilt angle of the image surface are performed, to further improve the image quality.

In one embodiment, one round of the one-dimensional search for the best tilt angle of the image plane is processed as follows: starting from $\beta=\beta_0$ and using $\Delta\beta$ as an interval, and taking a value within a range $[\beta_0-\beta_r, \beta_0+\beta_r]$ as $\beta$, wherein $\beta r$ is a radius size of the range $[\beta_0-\beta_r, \beta_0+\beta_r]$. The values of $\beta$ are defined as $\beta_1, \beta_2, \ldots, \beta_b, \ldots, \beta_B$, and the number of the tilt angle of the image plane is B. For a compact off-axis structure $C_m$ under the OP distribution form $P_m$, taking the off-axis spherical system corresponding to the compact off-axis structure $C_m$ as the starting point for calculation, and calculating the freeform surface imaging systems when the tilt angle of the image plane is $\beta_1$, $\beta_2, \ldots, \beta_b, \ldots, \beta_B$ through step S3 and step S4 respectively; an image quality evaluation parameter of the freeform surface imaging systems is defined as $\theta_1, \sigma_2, \ldots, \sigma_b, \ldots, \sigma_B$; finding the best image quality evaluation parameter from $\sigma_1, \sigma_2, \ldots, \sigma_b, \ldots, \sigma_B$ and defining as $\rho$, and a tilt angle $\beta_{opt}$ of the image plane corresponding to $\rho$ is the best tilt angle of the image plane in the current round of one-dimensional search. The only difference between a next round of one-dimensional search and the current round of one-dimensional search is that the value range of $\beta$ has changed, and a value taken within a range $[\beta_{opt}-\beta_r, \beta_{opt}+\beta_r]$ is as $\beta$. During performing multiple rounds of one-dimensional search, the image quality $\rho$ of the freeform surface imaging system is continuously improved and gradually converged. If the image quality $\rho$ of the freeform surface imaging system reaches a given threshold $\rho_{srh}$, the one-dimensional search can be stopped. An image quality improvement rate $\nu$ is calculated by $\nu=(\rho'-\rho)/\rho$, wherein $\rho'$ is the best image quality evaluation parameter of the freeform surface imaging system in a previous round of one-dimensional search, and $\rho$ is the best image quality evaluation parameter of freeform surface imaging system in the current round of one-dimensional search. If the image quality improvement rate $\nu$ reaches a given threshold $\nu_{srh}$, the one-dimensional search can be stopped.

In a process of the one-dimensional search, since the tilt angle of the image surface has changed, the obstruction may appear in the freeform surface imaging system, therefore, it is necessary to judge the obstruction in the freeform surface imaging system at any time and eliminate the freeform surface imaging systems with obstruction.

A method of judging whether there is obstruction in the freeform surface imaging system is the same as the method in step S2. Once there is an obstruction in a freeform surface imaging system, the image quality evaluation parameter $\sigma$ of the corresponding system is set to NaN, and then the next image plane tilt angle state is continue to be calculated. In one embodiment, a field expansion coefficient $K_F$ is used to expand the field of the freeform surface imaging system in the process of judging the obstruction, and an aperture expansion factor $K_D$ is used to expand the aperture of the system to ensure that there is enough space between the components in the freeform surface imaging system.

In one round of one-dimensional search, if except that the tilt angle of the image plane is $\beta_0$, the image quality evaluation parameters of the freeform surface imaging systems corresponding to other tilt angles of image planes are NaN; there are obscurations in all freeform surface imaging systems that have been calculated, and the image quality improvement rate $\nu$ of the current round of one-dimensional search is zero.

When the image quality improvement rate $\nu$ is lower than a given threshold $\nu_{srh}$, an additional round of one-dimensional search can be added. If the image quality improvement rate of the additional round of one-dimensional search is still lower than the given threshold $\nu_{srh}$, the one-dimensional search process is terminated, and a freeform surface imaging system with the best image quality is as the final result.

Too many rounds of the one-dimensional search require too long calculation time. In one embodiment, a maximum number of rounds of one-dimensional search $Rnd_{max}$ is set. When the number of rounds of the one-dimensional search Rnd is greater than $Rnd_{max}$, the one-dimensional search is terminated.

In step S5, the evaluation metric can be selected according to actual needs. In one embodiment, the evaluation metric is imaging quality metric. The imaging quality metric comprises a discrete spot size of image points on the image plane, an MTF of the system, a wave aberration of the full field, etc. In one embodiment, an average value of wave aberration RMS in the whole field of the freeform surface imaging system is required to be no less than 0.075λ. According to the imaging quality metric, the freeform surface imaging system meeting the design requirement is selected and outputted.

Figure 6:
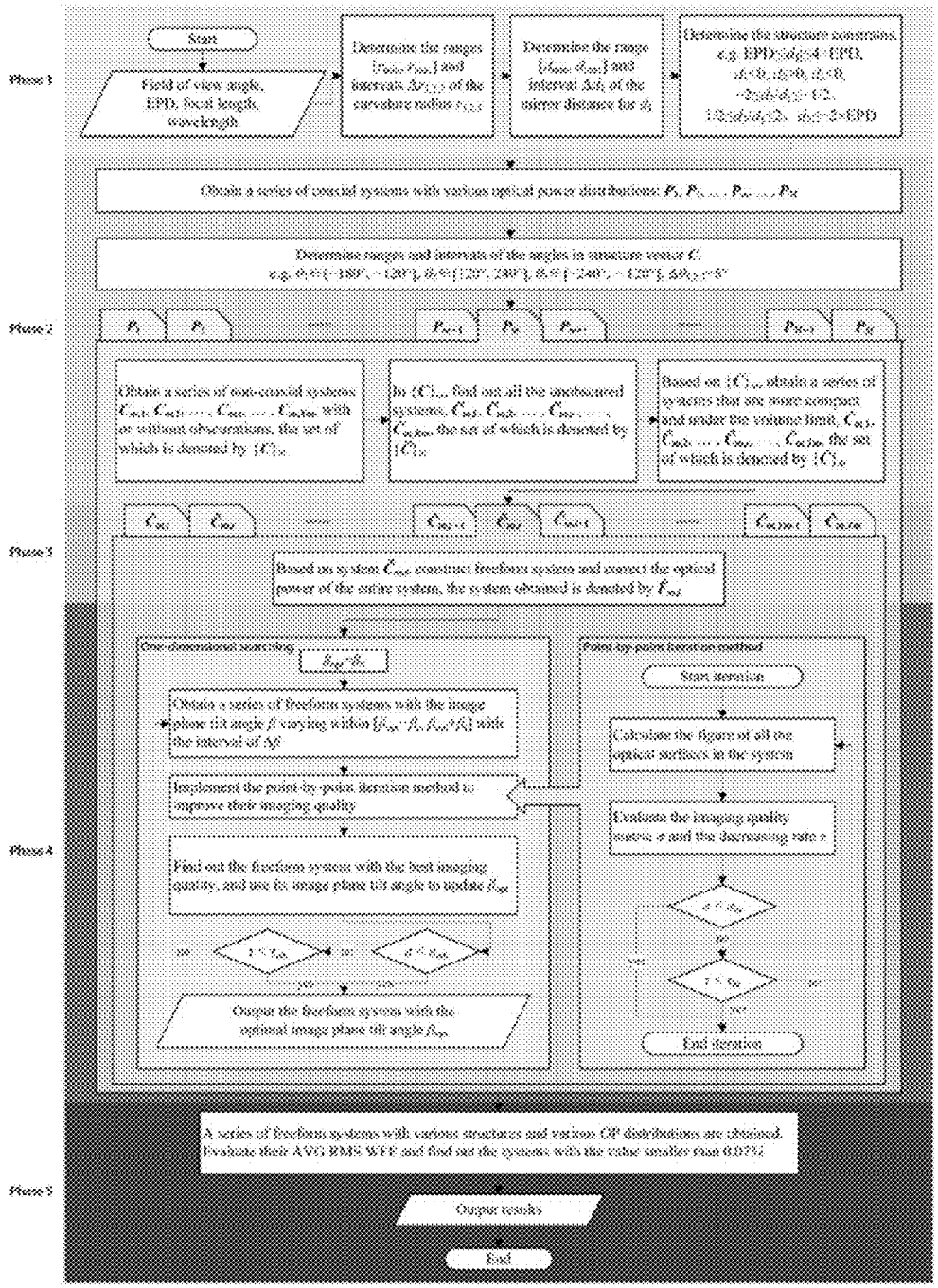
FIG. 6 is an entire framework flowchart of the method for designing freeform surface imaging system in FIG. 1.

An entire framework flowchart of the method for designing freeform surface imaging system provided by the present invention is shown in FIG. 6.

The method for designing freeform surface imaging system can be implemented via computer software. In one embodiment, a calculation program is developed using MATLAB. First a debugging of the calculation program is completed on a computer, and then a calculation work is completed on a high-performance computing platform "Exploration 100".

In one embodiment, the method for designing freeform surface imaging system further comprises a step of manufacturing the freeform surface imaging system according to parameters of the freeform surface imaging system outputted in step S5, to obtain a physical component of the freeform surface imaging system.

The following are two examples of designing a freeform three-mirror imaging system using the method for designing freeform surface imaging system of the present invention.

Example 1

The optical performance indexes of the freeform surface three-mirror imaging system to be designed and the parameters used in the design method are shown in Table 1 and Table 2.

TABLE 1 input parameters

| | | |
|---|---|---|
| System parameters | field | ±4 in X, ±3 in Y |
| | Full field angles (°) | 8° × 6° |
| | Entrance pupil diameter (EPD) (mm) | 27.78 |
| | Focal length (mm) | 50 |
| | Working band | LWIR |
| | Primary wavelength | 8-14 μm |
| Step S1 | Range and interval of the curvature radius for spherical surfaces (mm) | $r_{1,2,3} \in [-1000, 1000]$, $\Delta r_{1,2,3} = 100$ |
| | Structure constraints | EPD < $|d_1|$ < 4 × EPD $\Delta d_1$ = EPD/2 $d_1 < 0, d_2 > 0, d_3 < 0$ $-2 \leq d_2/d_1 \leq -1/2$, $1/2 \leq d_3/d_1 \leq 2$, $d_3 \leq -2 \times$ EPD |
| Step S2 | Range and interval of the angle in the vector when solving the off-axis spherical system | $\theta_1 \in (-180°, -120°]$, $\theta_2 \in [120°, 240°]$, $\theta_3 \in [-240°, -120°]$, $\Delta \theta_{1,2,3} = 5°$ |
| | field expansion coefficient $K_F$ and aperture expansion factor $K_D$ | $K_F = 1.5, K_D = 1.2$ |
| | the maximum allowable angle $\theta_{max}$ of dichotomy method for solving compact structure | $\theta_{max} = 5°$ |

TABLE 2

Built-in methods and parameters

| | | |
|---|---|---|
| Step S3 | Optical power correction process | point-by-point construction method |
| | Field angles sampled over the half field angle | (0, 0) (0, 1.5) (0, −1.5) (2, 0) (2, 1.5) (2, −1.5) |
| | Number of feature light rays sampled over the full aperture for one field angle | 97 |
| step S4 | Method to improve the imaging quality | Point-by-point iteration method |
| | Field angles sampled over the half field angle | (0, 0) (0, 1.5) (0, −1.5) (2, 0) (2, 1.5) (2, −1.5) |
| | Number of feature light rays sampled over the full aperture for one field angle | 97 |
| | Iteration termination condition: imaging quality threshold | $\sigma_{itr} = 0.003$ |
| | Iteration termination condition: imaging quality improvement rate threshold | $\tau_{itr} = 0.5\%$ |
| | Image quality priority mode activation conditions: image quality improvement rate threshold | $\tau_{iqf} = 3\%$ |
| Step S4 | Range and interval for the one-dimensional search of image plane tilt angle (°) | $\beta \in [\beta_0 - 5, \beta_0 + 5], \Delta\beta = 1$ |
| | One-dimensional searching termination condition: imaging quality threshold | $\rho_{srh} = 0.003$ |
| | One-dimensional searching termination condition: imaging quality improvement rate threshold | $\upsilon_{srh} = 0.5\%$ |
| | One-dimensional searching termination condition: maximum round number $Rnd_{max}$ | $Rnd_{max} = 3$ |

After the system performance indexes and constraints are inputted into a computer, a computing task is completed in approximately 40.4 h without human interaction. Then CODE V is used as a tool to evaluate the image quality of the freeform surface three-mirror imaging system, 11×11 field points are sampled over the 8°×6° field, and the average of the root-mean-square (RMS) values of the wavefront error value at each field point when the wavelength λ=10 m is calculated. If the average value of the RMS value of wavefront error at all field points is no greater than 0.075λ, wherein λ is a primary wavelength, the image quality of the freeform surface three-mirror imaging system is considered to be diffraction-limited or near-diffraction-limited. A total of 127 freeform surface three-mirror imaging systems that satisfy the design requirements are obtained, and an average time to obtain one freeform surface three-mirror imaging system is 19.1 min.

Figure 7:
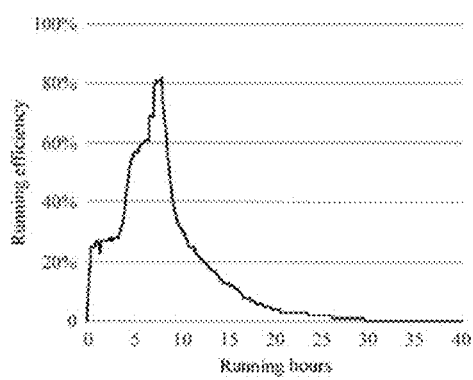
FIG. 7 shows a curve of an operating efficiency of a calculation task of Example 1 over time.

FIG. 7 shows a curve of an operating efficiency of the calculation task of Example 1 over time. A horizontal axis represents a running time (units: h), and a vertical axis represents a percentage of computing resources currently used in the largest computing resources. That is, the vertical axis represents an operating efficiency of the computing task. In one embodiment, each computing task consists of multiple independent computing jobs, and the multiple independent computing jobs are submitted to a distributed system one by one to wait for calculation. Each of the multiple independent computing jobs corresponds to a freeform surface three-mirror imaging system corresponding the structural form of $\tilde{C}_{m,t}$ with the OP distribution of $P_m$. Since computing tasks of other users are still running on the computing platform, so the operating efficiency of the program cannot reach the maximum after submission. The highest operating efficiency of the calculation task in FIG. 7 is 81.5%. Since the previously submitted tasks have been completed one after another, and all calculation tasks have been submitted; about 7.08 hours after the calculation task started, the operating efficiency began to drop. About 24.5 hours after the calculation task started, the operating efficiency dropped below 2.0%, and more than 99.0% of the computing tasks have been completed. A total workload of the calculation task can be obtained by integrating the operating efficiency with time; therefore, a theoretical calculation time is estimated about 6.17 hours when the operating efficiency is 100%. The current computing time is shared between the computing platform and other users. If computing resources can be monopolized, the computing time can be shorter than the current time.

Figure 8:
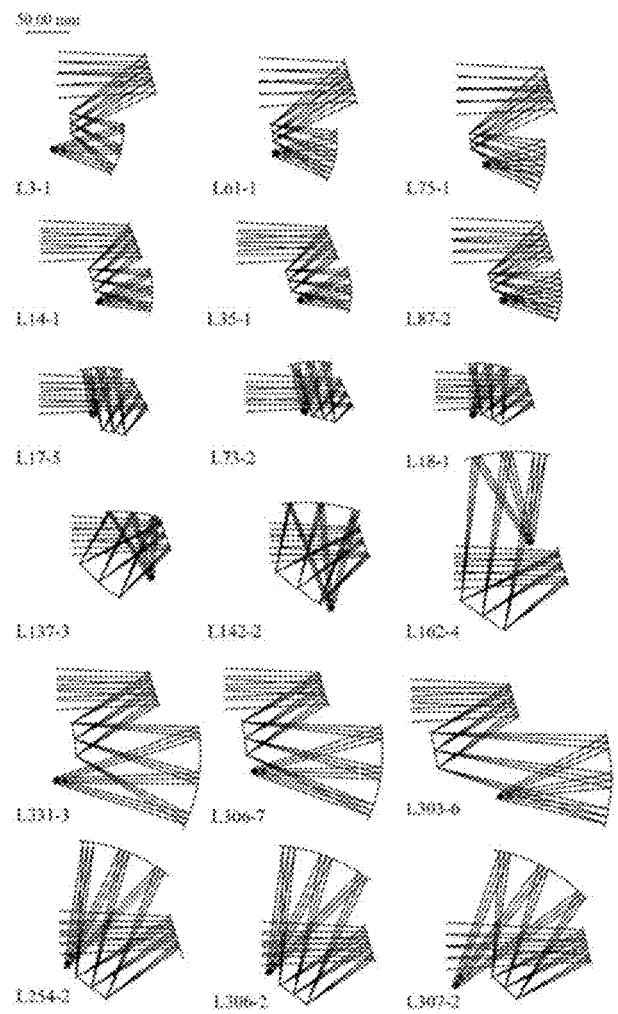
FIG. 8 shows some of freeform surface imaging systems obtained of Example 1.

FIG. 8 shows some of the design results on the same scale of example 1. The freeform surface three-mirror imaging systems of example 1 have different structural forms, different optical power distributions and different volumes. The image quality of the freeform surface three-mirror imaging systems can approach or reach the diffraction limit. The freeform surface three-mirror imaging systems L3-1, L61-1 and L75-1 have similar structures and volumes but different OP distributions. The freeform surface three-mirror imaging systems L14-1, L35-1 and L87-2 have similar structures and volumes but different OP distributions. It can be seen that the volume of each of the freeform surface three-mirror imaging systems in the second row is smaller than the volume of each of the freeform surface three-mirror imaging systems in the first row, and the optical path of each of the freeform surface three-mirror imaging systems in the second row is more compact than the optical path of each of the freeform surface three-mirror imaging in the first row. The structures of the freeform surface three-mirror imaging systems L17-5, L73-2 and L18-1 are not commonly seen and are the most compact among the output results. The freeform surface three-mirror imaging systems L137-3 and L142-2 have spherical contour structures. The primary mirror and the secondary mirror are convex in the freeform surface three-mirror imaging systems L331-3, L306-7 and L303-6; L254-2, L306-2 and L307-2 in the final row, which leads to large system volumes. The structure of the freeform surface three-mirror imaging L162-4 has rarely been seen before.

Example 2

The optical performance indexes of the freeform three-mirror imaging system to be designed and the parameters used in the design method are shown in Table 3 and Table 4.

TABLE 3

| | input parameters | |
|---|---|---|
| System parameters | field | ±2X, ±2Y |
| | Full field angles (°) | 4° × 4° |
| | Entrance pupil diameter (EPD) (mm) | 50 |
| | Focal length (mm) | 450 |
| | Working band | VIS |
| | Primary wavelength | 420-680 nm |
| Step S1 | Range and interval of the curvature radius for spherical surfaces (mm) | $r_{1,2,3} \in [-1000, 1000]$, $\Delta r_{1,2,3} = 100$ |
| | Structure constraints | EPD/2 < $|d_1|$ < 5 × EPD<br>$\Delta d_1$ = EPD/2<br>$d_1 < 0, d_2 > 0, d_3 < 0$<br>$-2 \leq d_2/d_1 \leq -1/2$,<br>$1/2 \leq d_3/d_1 \leq 2$,<br>$d_3 \leq -2 \times$ EPD |
| Step S2 | Range and interval of the angle in the vector when solving the off-axis spherical system | $\theta_1 \in (-180°, -120°]$,<br>$\theta_2 \in [120°, 240°]$,<br>$\theta_3 \in [-240°, -120°]$,<br>$\Delta\theta_{1,2,3} = 20°$ |
| | field expansion coefficient $K_F$ and aperture expansion factor $K_D$ | $K_F = 1.5$, $K_D = 1.2$ |
| | Volume limit | no |
| | the maximum allowable angle θmax of dichotomy method for solving compact structure | $\theta_{max} = 5°$ |

TABLE 4

| | Built-in methods and parameters | |
|---|---|---|
| Step S3 | Optical power correction process | point-by-point construction method |
| | Field angles sampled over the half field angle | (0, 0) (0, 2) (0, -2)<br>(2, 0) (2, 2) (2, -2) |
| | Number of feature light rays sampled over the full aperture for one field angle | 97 |
| Step S4 | Method to improve the imaging quality | Point-by-point iteration method |
| | Field angles sampled over the half field angle | (0, 0) (0, 2) (0, -2)<br>(2, 0) (2, 2) (2, -2) |
| | Number of feature light rays sampled over the full aperture for one field angle | 97 |
| | Iteration termination condition: imaging quality threshold | $\sigma_{itr} = 0.003$ |

TABLE 4-continued

| | Built-in methods and parameters | |
|---|---|---|
| Step S4 | Iteration termination condition: imaging quality improvement rate threshold | $\tau_{itr} = 0.5\%$ |
| | Image quality priority mode activation conditions: image quality improvement rate threshold | $\tau_{iqf} = 3\%$ |
| | Range and interval for the one-dimensional search of image plane tilt angle (°) | $\beta \in [\beta_0 - 5, \beta_0 + 5], \Delta\beta = 1$ |
| | One-dimensional searching termination condition: imaging quality threshold | $\rho_{srh} = 0.003$ |
| | One-dimensional searching termination condition: imaging quality improvement rate threshold | $\upsilon_{srh} = 0.5\%$ |
| | One-dimensional searching termination condition: maximum round number $\text{Rnd}_{max}$ | $\text{Rnd}_{max} = 3$ |

In one embodiment, the working band is visible light. In a visible light system, a requirement of a accuracy in calculating the shape of the curved surface is high. Moreover, the relative aperture of the freeform surface three-mirror imaging system is relatively small, and the structure of the freeform surface three-mirror imaging system is more variety than the freeform surface three-mirror imaging system with a large relative aperture. A computing task is completed in approximately 34.6 h without human interaction, a total of 59 freeform surface imaging systems that satisfy the design requirements are obtained, and an average time to obtain one freeform surface imaging system is 35.2 min.

Figure 9:
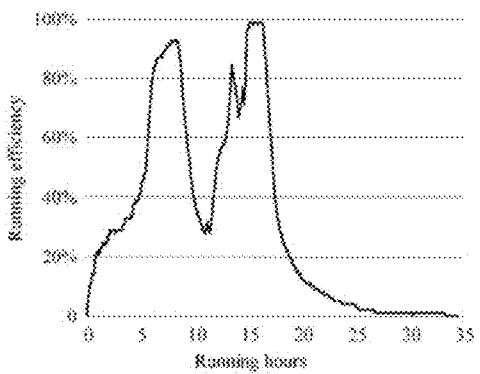
FIG. 9 shows a curve of an operating efficiency of a calculation task of Example 2 over time.

FIG. 9 shows a curve of an operating efficiency of the calculation task of Example 2 over time. Compared with the calculation task of embodiment 1, an average operating efficiency of embodiment 2 is higher. That is, although the calculation amount of Example 2 is more than that of Example 1, the calculating time of Example 2 is shorter than the calculating time of Example 1. The highest efficiency in the entire calculation process of Example 2 can reach 99.0%. About 16.4 hours after the calculation task started, the operating efficiency began to drop. About 22.6 hours after the calculation task started, the operating efficiency dropped below 2.0%, and more than 99.7% of the computing tasks have been completed. A total workload of the calculation task can be obtained by integrating the operating efficiency with time; therefore, a theoretical calculation time is estimated about 11.0 hours when the operating efficiency is 100%.

Figure 10:
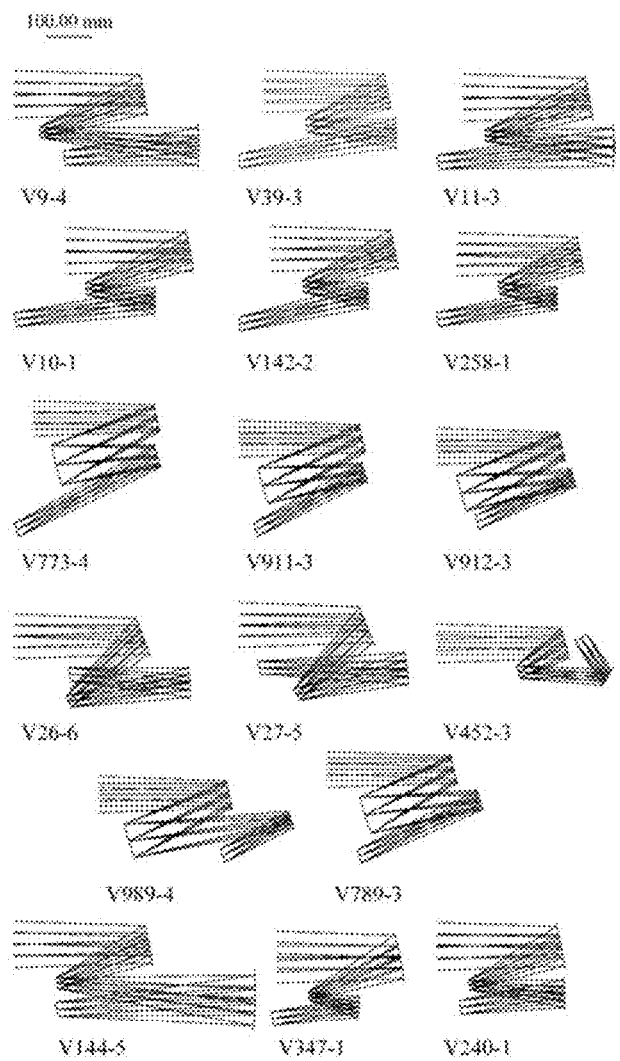
FIG. 10 shows some of freeform surface imaging systems obtained of Example 2.

FIG. 10 shows some of the design results on the same scale of example 2. The freeform surface three-mirror imaging systems V9-4, V39-3 and V11-3 in the first row represent three most common structural forms. The three freeform surface three-mirror imaging systems V10-1, V142-2 and V258-1 in the second row have the same structural form, but different sizes. The freeform surface three-mirror imaging V773-4 and V911-3 in the third row have the same structural form, but different sizes. Compared with the freeform surface three-mirror imaging systems V773-4 and V911-3, the freeform surface three-mirror imaging system V912-3 has a more compact structure and a smaller volume. A structure of each of the freeform surface three-mirror imaging systems V26-6, V27-5 and V452-3 in the fourth row has rarely been seen before. The focal power of the primary mirror and the tertiary mirror of each of the freeform surface three-mirror imaging systems V989-4 and V789-3 in the fifth row are negative. A distance between the tertiary mirror and the image plane in the freeform surface three-mirror imaging system V989-4 is shorter than a distance between the tertiary mirror and other mirrors. The distance between the tertiary mirror and the image plane in the freeform surface three-mirror imaging system V789-3 is longer than the distance between the tertiary mirror and the image plane in the freeform surface three-mirror imaging system V989-4. The distance between the secondary mirror and the image plane of the freeform surface three-mirror imaging system V144-5 in the last row of is relatively tight, and the tertiary mirror is located far away from both the secondary mirror and the image plane. The freeform surface three-mirror imaging systems V347-1 and V240-1 have smaller volumes and compact structures. The freeform surface three-mirror imaging system V240-1 is the best design result among all the output results.

The method for designing freeform surface imaging system provided by the present invention has advantages as follows: first, as long as the optical parameters and structural constraints of an optical system are given, a series of freeform surface imaging systems with different structural forms and OP distribution forms can be obtained through automatic calculation without manual intervention. The image quality of the freeform surface imaging systems obtained by the method is close to or reaches the diffraction limit. The freeform surface imaging systems meet the given optical parameters and structural constraints, and the image quality parameters such as wave aberration and modulation transfer function MTF meet the design requirements. Second, in the final stage of optical design, after the image quality of the freeform surface three-mirror system meets the requirements, the designer only needs to select the best one from the many results as the final design result by comprehensively considering factors such as processing difficulty, system structure and shape, therefore, human resources and experience requirements for optical designers are greatly reduced. Third, the method provided by the present invention provides a new idea for liberating and expanding optical design productivity in the future, by realizing high-quality, multi-result, and automated freeform surface imaging system design.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method for designing freeform surface imaging system, the method comprises:
    S1: constructing a series of coaxial spherical systems with different optical power (OP) distributions, wherein the series of coaxial spherical systems with different OP distributions are defined as $P_1, P_2, \ldots, P_m, \ldots, P_M$, and a set of $P_1, P_2, \ldots, P_m, \ldots, P_M$ is defined as a set $\{P\}$; and the OP distribution refers to a combination of radii of curvature of surfaces of the coaxial spherical system and distances between surfaces of the coaxial spherical system;
    S2: tilting all optical elements of each coaxial spherical system in the set $\{P\}$ by a series of angles to obtain a series of off-axis spherical systems, wherein the series of off-axis spherical systems are defined as $C_{m,1}, C_{m,2}, \ldots, C_{m,s}, \ldots, C_{m,S_m}$, and a set of the $C_{m,1}, C_{m,2}, \ldots, C_{m,s}$ is defined as a set $\{C\}_m$; finding all unobscured off-axis spherical systems from the set $\{C\}_m$, wherein the unobscured off-axis spherical systems are defined as $\overline{C}_{m,1}, \overline{C}_{m,2}, \ldots, \overline{C}_{m,r}, \ldots, \overline{C}_{m,R_m}$, and a set of $\overline{C}_{m,1}, \overline{C}_{m,2}, \ldots, \overline{C}_{m,r}, \ldots, \overline{C}_{m,R_m}$ is defined as a set $\{\overline{C}\}_m$; and then specifying a system size or structural constraints, and finding a series of compact unobstructed off-axis spherical systems from the set $\{\overline{C}\}m$, wherein the series of compact unobstructed off-axis spherical systems are defined as $\tilde{C}_{m,1}, \tilde{C}_{m,2}, \ldots \tilde{C}_{m,t}, \ldots, \tilde{C}_{m,T_m}$, and a set of $\tilde{C}_{m,1}, \tilde{C}_{m,2}, \ldots, \tilde{C}_{m,t}, \ldots, \tilde{C}_{m,T_m}$ is defined as a set $\{\tilde{C}\}_m$;
    S3: constructing a series of freeform surface imaging systems based on the series of compact unobstructed off-axis spherical system in the set $\{\tilde{C}\}_m$, and correcting an OP of each of the series of freeform surface imaging systems in a process of constructing the series of freeform surface imaging systems, wherein the series of freeform imaging systems are defined as $\tilde{F}_{m,1}, \tilde{F}_{m,2}, \ldots, \tilde{F}_{m,t}, \ldots, \tilde{F}_{m,T_m}$, and a set of $\tilde{F}_{m,1}, \tilde{F}_{m,2}, \ldots, \tilde{F}_{m,t}, \ldots, \tilde{F}_{m,T_m}$ is defined as a set $\{\tilde{F}\}m$;
    S4: improving an image quality of each of the series of freeform surface imaging systems in the set $\{\tilde{F}\}_m$ by calculating a surface shape of each optical element of each freeform surface imaging system in the set $\{\tilde{F}\}_m$ and finding an optimal tilt angle of an image surface, to obtained a series of freeform surface imaging systems with different structural forms and different OP distributions; and
    S5: automatically evaluating an image quality of each of the series of freeform surface imaging system with different structural forms and different OP distributions based on an evaluation metric, and outputting at least one freeform surface imaging system that meets a given requirements.

2. The method of claim 1, wherein in step S1, the series of coaxial spherical systems with different OP distributions are constructed according to first-order optics and a known focal length.

3. The method of claim 2, wherein an image focal length f of a coaxial spherical system in the set $\{P\}$ is expressed as:

$$f' = \frac{n_N}{A(r_i, d_i, n_i)},$$

wherein "A" is a function of $r_i$, $d_i$ and $n_i$, "A" is defined as $A(r_i, d_i, n_i)$, and $n_N$ represents a refractive index of a medium between a spherical surface $S_N$ and a spherical surface $S_{N+1}$.

4. The method of claim 3, wherein there is a total of 2N−1 parameters for the radii of curvature and the distances, the radii of curvature are defined as $r_1, r_2, \ldots, r_N$, and the distances are defined as $d_1, d_2, \ldots, d_{N-1}$; when the image focal length of the coaxial spherical system is given, after the 2N−1 parameters are obtained, a distance between a last spherical surface and the image surface $d_N$ is solved by the first order optics, therefore, there are a total of 2N parameters describing the coaxial spherical system.

5. The method of claim 4, wherein the 2N parameters are placed together in a vector $P=[r_1, r_2, \ldots, r_{N-1}, r_N, d_1, d_2, \ldots, d_{N-1}, d_N]$, and the vector P is configured to describe the OP distribution of the coaxial spherical system.

6. The method of claim 5, wherein the radii of curvature are defined as $r_i$, and i=1, 2, ..., N, a range of each $r_i$ is $[r_{min}, r_{max}]$ with an interval $\Delta r$, and $r_i=r_{min}+\Delta r, r_{min}+2\Delta r, \ldots, r_{max}$.

7. The method of claim 6, wherein the range of each $r_i$ is [−1000 mm, 1000 mm], and $\Delta r$=100 mm.

8. The method of claim 5, wherein the distances between surfaces of the coaxial spherical system are defined as $d_i$, and i=1, 2, ..., N−2, a range of each $d_i$ is $[d_{min}, d_{max}]$ with an interval $\Delta d$, and $d_i=d_{min}+\Delta d, d_{min}+2\Delta d, \ldots, d_{max}$.

9. The method of claim 8, wherein EPD≤|$d_1$|≤4×EPD, wherein EPD is an entrance pupil diameter of the coaxial spherical system.

10. The method of claim 1, wherein a global coordinate system O-XYZ is defined, an incident direction of light ray in a central field (0°) is defined as a Z axis, and a plane perpendicular to the Z axis is defined as an XOY plane; a local coordinate system is established at each surface of each off-axis spherical system in the set $\{C\}_m$; an incident point of the chief light ray of the central field on a mirror surface $S_i$ is defined as $V_i$, and a local coordinate system $V_i$-XYZ is established with $V_i$ as origin, a unit axis vector $V_iZ$ and a surface normal direction of a surface at $V_i$ are parallel, a unit axis vector $V_iY$ is in a plane O-YZ of the global coordinate system O-XYZ and is perpendicular to the unit axis vector $V_iZ$, and a unit axis vector $V_iX$ and a unit axis vector OX have the same direction; a projection of a light beam between the mirror surface $S_i$ and a mirror surface $S_{i+1}$ in the O-YZ plane is defined as $B_i$, wherein i=0, 1, ..., N, an area illuminated by a light beam on the mirror surface is defined as a working area of the mirror surface, a curve segment of a working area of a mirror surface $S_j$ intercepted by the O-YZ plane is defined as $E_1^{(j)}E_2^{(j)}$, wherein j=0, 1, ..., N, I, and $S_I$ means the image surface; and a condition of no obstruction in the off-axis spherical system is: for any $B_i$(i=0, 1, ..., N), any curve segment $E_1^{(j)}E_2^{(j)}$ (=1, 2, ..., N, I) has no overlap with $B_i$, and the unobscured off-axis spherical systems $\overline{C}_{m,1}, \overline{C}_{m,2}, \ldots, \overline{C}_{m,r}, \ldots, \overline{C}_{m,R_m}$ are obtained after filtering according to the condition.

11. The method of claim 1, wherein after the unobstructed off-axis spherical systems are obtained, a plurality of unobstructed off-axis spherical systems with a small folding angle of optical path at each mirror surface are further found from the series of unobstructed off-axis spherical system, to obtain the series of compact unobstructed off-axis spherical systems.

12. The method of claim 11, wherein with regard to an unobscured off-axis spherical system $\overline{C}_{m,r}$ with an OP distribution form $P_m$, a new vector $\Delta\overline{C}_{m,r}$ is defined, and $\Delta\overline{C}_{m,r} = \overline{C}_{m,r} - C_0 = [\Delta\theta_1, \Delta\theta_2, \ldots \Delta\theta_i, \ldots, \Delta\theta_N]$, wherein $C_0$ is a coaxial structure, and $\Delta\theta_i$ is a folding angle of the optical path at the mirror surface $S_i$, and a set of vectors $\Delta\overline{C}_{m,r}$ corresponding to the set $\{\overline{C}\}_m$ is defined as the set $\{\Delta\overline{C}\}_m$.

13. The method of claim 12, wherein the plurality of unobstructed off-axis spherical systems with the small folding angle of optical path at each mirror surface are further found from the series of unobstructed off-axis spherical system by a minimization method.

14. The method of claim 13, wherein the unobscured off-axis spherical system $\overline{C}_{m,r}$ with an OP distribution form $P_m$ is a three-mirror system, the vectors in the set $\{\Delta\overline{C}\}_m$ are classified to a plurality of categories, in each category, a first item $\Delta\theta_1$ and a second item $\Delta\theta_2$ are equal, the third item $\Delta\theta_3$ is different; a process of minimizing the item $\Delta\theta_3$ comprises: in each category, a vector with a minimum absolute value of $\Delta\theta_3$ is found, and an off-axis spherical system corresponding to the vector with the minimum absolute value of $\Delta\theta_3$ has the smallest optical path angle at a tertiary mirror; for the vector that has been minimized item $\Delta\theta_3$, a same process of minimizing item $\Delta\theta_3$ is used to minimize the term $\Delta\theta_2$ in the vector; and then, for the vector that has been minimized the item $\Delta\theta_2$ and the item $\Delta\theta_3$, the same process of minimizing item $\Delta\theta_3$ is used to minimize the term $\Delta\theta_1$ in the vector; and a set of vectors whose term $\Delta\theta_1$, term $\Delta\theta_2$ and term $\Delta\theta_3$ are all minimized are obtained; a plurality of structural vectors corresponding to the set of vectors are found from the set $\{\overline{C}\}_m$, and the plurality of structural vectors are the series of compact unobstructed off-axis spherical systems $\tilde{C}_{m,1}, \tilde{C}_{m,2}, \ldots, \tilde{C}_{m,r}, \ldots, \tilde{C}_{m,Tm}$.

15. The method of claim 14, further solving a series of off-axis spherical systems with a smaller optical path folding angle at each mirror surface based on the set $\{\tilde{C}\}_m$ by a dichotomy.

16. The method of claim 15, wherein an upper limit of unobstruction is $\theta_{i,uob}=\theta_i$, a lower limit of obstruction is $\theta_{i,obs}=\theta_{i0}$, an intermediate value is defined as $\theta_{i,mid}=(\theta_{i,uob}+\theta_{i,obs})/2$, if $\theta_i=\theta_{i,mid}$, the off-axis spherical system is unobstructed, then let $\theta_{i,uob}=\theta_{i,mid}$; if $\theta_i=\theta_{i,mid}$, the off-axis spherical system is obstructed, then let $\theta_{i,obs}=\theta_{i,mid}$; and above steps are repeated until $|\theta_{i,uob}-\theta_{i,obs}|<\theta_{max}$, wherein $\theta_{max}$ is a given threshold; and the upper limit $\theta_{3,uob}$, $\theta_{2,uob}$ and $\theta_{1,uob}$ at each mirror surface are solved according to above method, to obtain more compact unobstructed off-axis structure form vectors $\tilde{C}'_{m,r}=[\theta_{1,uob}, \theta_{2,uob}, \theta_{3,uob}]$.

17. The method of claim 1, wherein the optimal tilt angle of the image surface is found using a one-dimensional search method.

18. The method of claim 17, wherein one round of the one-dimensional search for the optimal tilt angle of the image surface comprises: a same off-axis spherical surface system is taken as a starting point, and only the tilt angle of the image surface is different in the process of constructing the freeform surface imaging system through the step S3 and step S4; when the tilt angle of the image surface is different, the image quality of the freeform surface imaging system is also different, and a tilt angle of the image surface corresponding to a freeform surface imaging system with a best image quality is the optimal tilt angle of the image surface.

19. The method of claim 18, wherein multiple rounds of one-dimensional search for the optimal tilt angle of the image surface are performed.

20. The method of claim 1, wherein in step S5, the evaluation metric is an imaging quality metric.

* * * * *